Feb. 24, 1953     M. D. WALKLET     2,629,420
TOY WHEEL AND METHOD OF MAKING
Filed Nov. 28, 1947
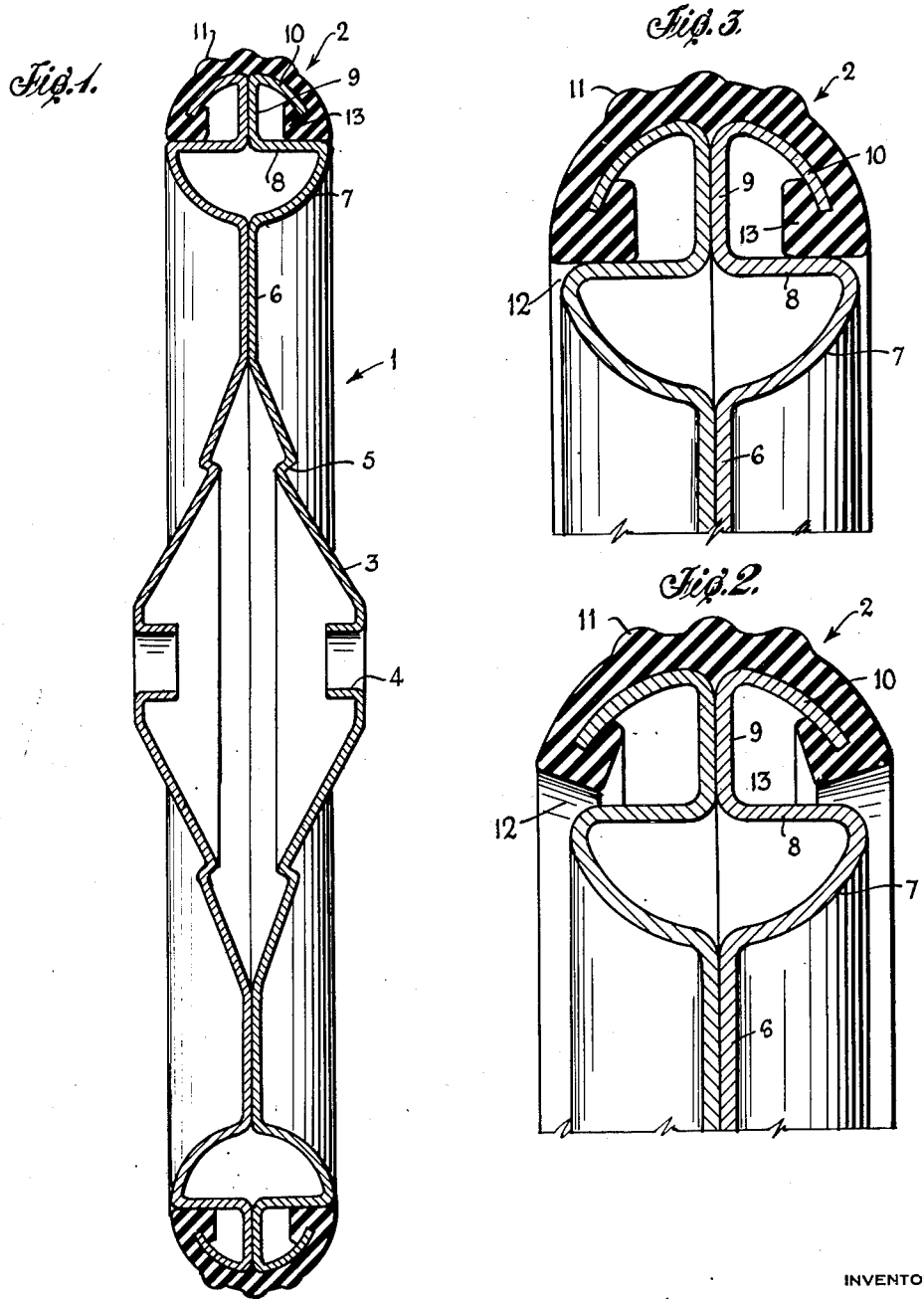
INVENTOR
MERCER D. WALKLET
BY
ATTORNEYS Patented Feb. 24, 1953

2,629,420

UNITED STATES PATENT OFFICE 2,629,420

TOY WHEEL AND METHOD OF MAKING

Mercer D. Walklet, Akron, Ohio

Application November 28, 1947, Serial No. 788,749

16 Claims. (Cl. 152—380)

The present invention relates to a new and improved construction for a tired wheel, and, in particular, to a wheel in miniature adapted for employment on toy vehicles. In the wheels for this purpose a solid rubber tire is usually cemented in a depressed channel formed on the periphery of a disk wheel. This type of wheel has certain disadvantages which it is the purpose of the present invention to overcome. One objection to the old-type wheel is the expense, due to the fact that a full, round rubber tire is employed, and another objection is the fact that in service the rubber tire frequently becomes detached from its seat on the wheel.

With the construction shown and described herein the cost of the wheel is substantially reduced because the wheel employs much less rubber without sacrifice to the cushioning effect of the tire. While the saving in rubber in a single wheel may not be impressive, yet the production of these is very heavy and, as the vehicles or toys are usually sold at relatively close margins, the improved wheel constitutes a substantial saving in production and assembly. Furthermore, the tire is structurally anchored on the wheel and cannot be removed short of destruction of the tire.

While the invention is intended primarily for use on toy vehicles, the construction may also be adapted for larger scale use.

It is therefore among the objects of this invention to provide a tired wheel which is easy and economical of assembly, in which the tire is anchored with greater certainty than heretofore, and in which the amount of tire material is reduced without sacrifice to appearance or utility. It is a further object of the invention to construct such a tired wheel by an improved method.

To these and other ends which will become manifest as the description proceeds, the invention will be made clear in the accompanying specification taken in conjunction with the drawing in which like numerals represent like parts throughout the several views and in which:

Fig. 1 is a dimetral section through the completed wheel and tire assemblage;

Fig. 2 is a fragment of such a diametral section to enlarged scale at an intermediate stage of assembly; and Fig. 3 is a view similar to Fig. 2 with assembly completed.

In Fig. 1 there is shown generally at 1 a disk wheel having a tire shown generally at 2. The disk is preferably composed of two mirror-image elements, which may each be formed in a single stamping operation, and then secured together by appropriate means. Due to the similarity of the disk halves only one is shown with reference characters. Each half comprises a central, dome portion 3 having an inwardly flanged bearing portion 4 for reception of an axle. A staggered portion 5 may be provided in the dome or hub 3 for decorative purposes; and a planar portion 6 centrally of the wheel connects the hub with an annulus 7 of semi-circular section limited by a flange 8 directed axially of the wheel, continuing into a planar portion 9 in the plane of portion 6 and outwardly bent as at 10 in generally arcuate form to roughly parallel a tire profile in section, but spaced at its outer end from the semi-circular annulus 7, 8 for mounting the tire, as will appear.

The tire comprises a tractive portion which may have treads 11 and which has an inner profile corresponding generally with the flanges 10. Along a region 12 the tire has an inwardly bent, preferably flat portion to mate with the flange 8, and, from thence, an upwardly turned portion defining a loop dimensioned to snugly receive the outwardly bent portion 10 of the disk.

It will thus be seen that a tire, constructed generally along the lines indicated, can be assembled to the disk by the simple expedient of hooking the looped portion 12, 13 about the flange 10. As shown in Fig. 2, this mounting can be facilitated if the flanges 10 are arranged outwardly of their final position in the fabrication of the disk. The mounting is then completed by pressing the flanges to final, tire-locking position shown in Fig. 3.

The resultant product is sparing of tire material, as will be noted in the space bounded by walls 8, 9, 10, 13. Yet the outward appearance is maintained as well as sturdiness of construction. At the same time, a tire-retaining feature is provided which is positive and of no greater complexity in assembly than the simple act of placing the tire on the wheel.

It will be understood that the embodiment shown which represents the presently preferred form of the invention does not encompass the entire scope thereof and that certain changes may be made without departing from the scope of the invention as defined in the appended claims. For instance, the flange 10 need not be continuously annular, but being concealed, may be serrated to facilitate bending; the exact form of the arc at 10 may also be varied as well as the loop in the tire at 13; and, in particular the latter need not be continuously annular. The tire may be made and vulcanized in strip form or it may be vulcanized as an endless annular unit.

What is claimed is:

1. A method of constructing a tired wheel comprising the steps of providing a wheel portion proper having a set of outwardly opposed flanges at its periphery, providing a tire having inwardly looped portions on its inner periphery, engaging said looped portions around the extremities of said flanges and bringing the loop-engaging extremities into contact with a portion of said wheel whereby to lock the tire in place.

2. A method of making a tired wheel which comprises providing a pair of wheel portions proper, bending the said portions transversely at their peripheries, joining the said portions so that the bent portions are in opposed direction and outwardly of the wheel, placing a tire around the said bent portions in engaging relation with the extremities thereof, respectively, and bringing the so-engaged extremities into contact with a portion of the wheel to lock the tire in place.

3. A method of making a tired wheel which comprises providing a pair of wheel portions proper, bending the said portions transversely at their peripheries into generally arcuate form, joining the said portions so that the bent portions are in opposed direction and generally outwardly of the wheel, placing a tire around the said bent portions in engaging relation with the extremities thereof, respectively, and bringing the so-engaged extremities into contact with a portion of the wheel to lock the tire in place.

4. A method of making a tired wheel which comprises providing a pair of wheel portions proper, deforming the said portions to provide, in each, a hollow rim portion, and an outwardly turned flange at the outward portion of said hollow rim portion, joining a pair of said wheel portions with the outwardly turned flanges opposed, engaging the inner peripheries of a tire around said outwardly bent peripheries, and bringing the so-engaged peripheries of the wheel portions substantially into contact with the said hollow rim portion, whereby to lock the tire in place.

5. The method of making a tired wheel which comprises providing a pair of wheel portions proper, deforming said wheel portions to provide a loop in each wheel portion outward of the plane of the wheel portion and constituting half of a hollow rim portion, forming a wall in the plane of each wheel portion outwarly of said rim portion and having a peripheral flange, joining said pair of wheel portions in back-to-back relation whereby the peripheral flanges are outwardly opposed, engaging the inner peripheral edges of a tire around the said flanges, and bending the so-engaged flanges in the direction of said rim portion whereby to lock the tire in place.

6. The method of claim 5 wherein said peripheral flanges are bent into generally arcuate form, terminating adjacent to but spaced from said rim portions.

7. A wheel structure comprising a central body portion, said structure terminating at its periphery in outwardly opposed flanges with free edges, and a tire having looped portions on its inner periphery enveloping the free edges of said flanges.

8. A wheel structure comprising a central body portion, said structure terminating at its periphery in outwardly opposed flanges of generally arcuate form with free edges, and a tire having looped portions on its inner periphery enveloping the free edges of said flanges.

9. A wheel structure comprising a central body portion, said structure terminating at its periphery in outwardly opposed flanges, with free edges, inclined generally at their extremities in a direction radially inwardly of the wheel, and a tire having looped portions on its inner periphery enveloping the free edges of said flanges.

10. A wheel structure comprising a central body portion, said structure terminating at its periphery in outwardly opposed flanges of generally arcuate form, with free edges, inclined at their extremities in a direction radially inwardly of the wheel, and a tire having looped portions on its inner periphery enveloping the free edges of said flanges.

11. A wheel structure comprising a central body portion, said structure terminating at its periphery in outwardly opposed flanges, with free edges, a tire having looped portions on its inner periphery enveloping the free edges of said flanges, and abutments on the body portion underlying the said looped portions of the tire in contacting relation therewith to lock the said looped portions in enveloping relation to said free edges.

12. A wheel structure comprising a central body portion, said structure terminating at its periphery in outwardly opposed flanges of generally arcuate form, with free edges, a tire having looped portions on its inner periphery enveloping the free edges of said flanges, and abutments on the body portion underlying the said looped portions of the tire in contacting relation therewith to lock the said looped portions in enveloping relation to said free edges.

13. A wheel structure comprising a central body portion, said structure terminating at its periphery in outwardly opposed flanges, with free edges, inclined generally at their extremities in a direction radially inwardly of the wheel, a tire having looped portions on its inner periphery enveloping the free edges of said flanges, and abutments on the body portion underlying the said looped portions of the tire in contacting relation therewith to lock the said looped portions in enveloping relation to said free edges.

14. A wheel structure comprising a central body portion, said structure terminating at its periphery in outwardly opposed flanges of generally arcuate form, with free edges, inclined at their extremities in a direction radially inwardly of the wheel, a tire having looped portions on its inner periphery enveloping the free edges of said flanges, and abutments on the body portion underlying the said looped portions of the tire in contacting relation therewith to lock the said looped portions in enveloping relation to said free edges.

15. A wheel structure comprising a central body portion and a continuous radially outer portion generally S-shaped in section on each side of a central plane of the wheel, the radially inner loop of the S simulating a wheel rim and the radially outer loop thereof constituting an anchoring means for the looped inner periphery of a tire to lock the same against the central part of the S.

16. A wheel structure comprising, on each side of a central plane normal to the wheel axis, a continuous structure comprising a central body portion, a cup-shaped flange simulating a wheel rim, an inwardly directed flange extending generally axially of the wheel, an upright portion extending generally radially of the wheel, and a terminal flange extending axially outwardly of the said upright portion and curved generally in the direction of the wheel axis and having a peripheral edge adapted to be brought into close proximity to the said inwardly directed flange whereby to lock a looped inner periphery of a tire in place.

MERCER D. WALKLET.

REFERENCES CITED

The following references are of record in the file of this patent:

UNITED STATES PATENTS

| Number | Name | Date |
|---|---|---|
| 360,162 | King | Mar. 29, 1887 |
| 1,380,906 | Hoffman | June 7, 1921 |
| 1,395,734 | Root | Nov. 1, 1921 |
| 1,456,966 | Benson | May 29, 1923 |
| 1,702,648 | Gammeter | Feb. 19, 1929 |
| 2,392,492 | Morgan et al. | Jan. 8, 1946 |

FOREIGN PATENTS

| Number | Country | Date |
|---|---|---|
| 799,461 | France | 1936 |